US012682027B2

(12) United States Patent
Shachar et al.

(10) Patent No.: US 12,682,027 B2
(45) Date of Patent: Jul. 14, 2026

(54) ACCESS CONTROL USING USER BEHAVIOR PROFILE AND STORAGE SYSTEM-BASED MULTI-FACTOR AUTHENTICATION

(71) Applicant: EMC IP Holding Company LLC, Hopkinton, MA (US)

(72) Inventors: Tomer Shachar, Omer (IL); Yevgeni Gehtman, Modi'in (IL); Maxim Balin, Gan-Yavne (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 484 days.

(21) Appl. No.: 17/332,115

(22) Filed: May 27, 2021

(65) Prior Publication Data

US 2022/0382837 A1 Dec. 1, 2022

(51) Int. Cl.
*G06F 21/31* (2013.01)
*G06N 20/00* (2019.01)
*H04L 9/40* (2022.01)

(52) U.S. Cl.
CPC ........... *G06F 21/316* (2013.01); *G06N 20/00* (2019.01); *H04L 63/18* (2013.01); *H04L 2463/082* (2013.01)

(58) Field of Classification Search
CPC ....... G06F 21/316; G06N 20/00; H04L 63/18; H04L 2463/082
See application file for complete search history.

(56) References Cited

U.S. PATENT DOCUMENTS

| | | | | |
|---|---|---|---|---|
| 10,108,791 B1 * | 10/2018 | Masterman | ........... | G06F 21/316 |
| 10,587,596 B1 * | 3/2020 | Sahar | ....................... | H04L 63/08 |
| 10,592,978 B1 * | 3/2020 | Vaystikh | ................. | G06F 21/31 |
| 10,860,382 B1 * | 12/2020 | Sharifi Mehr | ........ | G06F 9/5038 |
| 11,113,370 B2 * | 9/2021 | Toth | ....................... | G06N 20/00 |
| 11,170,104 B1 * | 11/2021 | Stickle | ................... | G06N 20/00 |

(Continued)

OTHER PUBLICATIONS https://www.cisco.com/c/en/us/products/security/what-is-multi-factor-authentication.html#~methods, downloaded Apr. 21, 2021.

(Continued)

*Primary Examiner* — Gary S Gracia

(74) *Attorney, Agent, or Firm* — Ryan, Mason & Lewis, LLP

(57) ABSTRACT

Techniques are provided for access control using user behavior profiles and storage system-based multi-factor authentication. One method comprises obtaining a behavior profile for a user; obtaining an input/output request from the user; determining whether the input/output request exhibits anomalous user behavior relative to the behavior profile; initiating a multi-factor authentication of the user in response to the input/output request exhibiting anomalous user behavior to obtain a verification result; and processing the input/output request based at least in part on the verification result. The behavior profile for the user may be obtained by obtaining behavioral information from the user and/or monitoring a plurality of input/output requests of the user to learn at least a portion of the behavior profile for the user. The multi-factor authentication may comprise an out-of-band authorization request (e.g., to approve the input/output request) sent to a user associated with the input/output request.

20 Claims, 6 Drawing Sheets

(56) References Cited

U.S. PATENT DOCUMENTS

| | | | | |
|---|---|---|---|---|
| 11,176,230 | B2 * | 11/2021 | Toth | G06F 21/6218 |
| 11,455,641 | B1 * | 9/2022 | Shahidzadeh | H04L 63/0892 |
| 11,552,953 | B1 * | 1/2023 | Avadhanam | H04L 63/102 |
| 11,775,623 | B2 * | 10/2023 | Toth | H04L 63/0861 |
| | | | | 726/7 |
| 11,853,415 | B1 * | 12/2023 | Wainer | G06N 7/01 |
| 12,399,965 | B2 * | 8/2025 | Gelardi | H04L 63/10 |
| 2015/0106870 | A1 * | 4/2015 | Li | G06F 21/54 |
| | | | | 726/1 |
| 2018/0332071 | A1 * | 11/2018 | Ford | H04L 9/3236 |
| 2019/0377853 | A1 * | 12/2019 | Obaidi | G06F 21/32 |
| 2020/0242222 | A1 * | 7/2020 | Machani | G06F 21/45 |
| 2020/0280575 | A1 * | 9/2020 | Dean | H04L 63/1441 |
| 2020/0334122 | A1 * | 10/2020 | Shepard | G06F 11/3089 |
| 2021/0173930 | A1 * | 6/2021 | Dahal | H04L 63/145 |
| 2021/0200450 | A1 * | 7/2021 | Lim | G06F 3/0604 |
| 2021/0209024 | A1 * | 7/2021 | Liang | G06F 12/0868 |
| 2022/0138292 | A1 * | 5/2022 | Wojnowicz | H04L 63/0861 |
| | | | | 726/7 |
| 2022/0164422 | A1 * | 5/2022 | Gelardi | G06F 21/316 |
| 2022/0182397 | A1 * | 6/2022 | Romero Zambrano | |
| | | | | H04L 63/1416 |
| 2022/0358235 | A1 * | 11/2022 | Gehtman | G06F 21/6218 |
| 2022/0382837 | A1 * | 12/2022 | Shachar | G06F 21/316 |

OTHER PUBLICATIONS https://support.huawei.com/enterprise/en/doc/EDOC1100140613/e53e49d7/how-do-i-log-in-to-the-storage-system-through-multi-factor-authentication, downloaded Apr. 21, 2021.
https://docs.microsoft.com/en-us/azure/active-directory/authentication/concept-mfa-howitworks, downloaded Apr. 21, 2021.
https://cloudstorageinfo.org/multi-factor-authentication, downloaded Apr. 21, 2021.

* cited by examiner

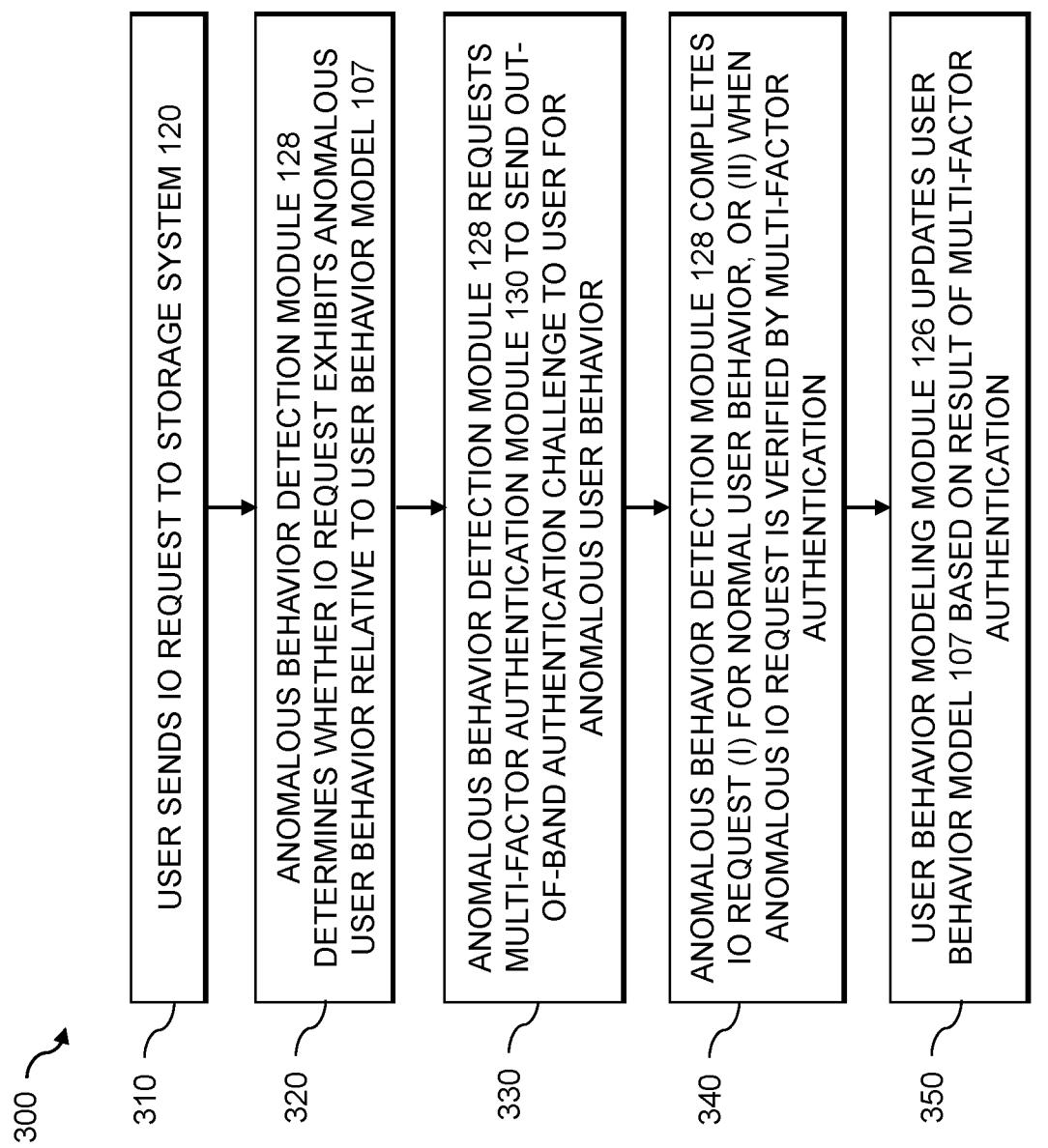

300

310 — USER SENDS IO REQUEST TO STORAGE SYSTEM 120

320 — ANOMALOUS BEHAVIOR DETECTION MODULE 128 DETERMINES WHETHER IO REQUEST EXHIBITS ANOMALOUS USER BEHAVIOR RELATIVE TO USER BEHAVIOR MODEL 107

330 — ANOMALOUS BEHAVIOR DETECTION MODULE 128 REQUESTS MULTI-FACTOR AUTHENTICATION MODULE 130 TO SEND OUT-OF-BAND AUTHENTICATION CHALLENGE TO USER FOR ANOMALOUS USER BEHAVIOR

340 — ANOMALOUS BEHAVIOR DETECTION MODULE 128 COMPLETES IO REQUEST (I) FOR NORMAL USER BEHAVIOR, OR (II) WHEN ANOMALOUS IO REQUEST IS VERIFIED BY MULTI-FACTOR AUTHENTICATION

350 — USER BEHAVIOR MODELING MODULE 126 UPDATES USER BEHAVIOR MODEL 107 BASED ON RESULT OF MULTI-FACTOR AUTHENTICATION

FIG. 3

410 — OBTAIN BEHAVIOR PROFILE FOR A USER

420 — OBTAIN IO REQUEST FROM USER

430 — DETERMINE WHETHER IO REQUEST FROM USER EXHIBITS ANOMALOUS USER BEHAVIOR RELATIVE TO BEHAVIOR PROFILE

440 — INITIATE MULTI-FACTOR AUTHENTICATION OF USER IN RESPONSE TO IO REQUEST EXHIBITING ANOMALOUS USER BEHAVIOR TO OBTAIN VERIFICATION RESULT

450 — PROCESS IO REQUEST BASED ON VERIFICATION RESULT

ACCESS CONTROL USING USER BEHAVIOR PROFILE AND STORAGE SYSTEM-BASED MULTI-FACTOR AUTHENTICATION

FIELD

The field relates generally to information processing techniques and more particularly, to the protection of data in such information processing systems.

BACKGROUND

Data protection techniques are often employed to secure data in a storage system, typically using encryption and other access control functions. Many organizations, however, desire additional protection for the storage of sensitive information. In some regions, regulations may require such additional protection for the storage of certain personal and/or business information.

A need exists for improved techniques for protecting data in a storage system.

SUMMARY

In one embodiment, a method comprises obtaining, in a storage system, a behavior profile for a user; obtaining, in the storage system, at least one input/output request from the user; determining, by the storage system, whether the at least one input/output request exhibits anomalous user behavior relative to the behavior profile; initiating, by the storage system, a multi-factor authentication of the user in response to the at least one input/output request exhibiting anomalous user behavior to obtain a verification result; and processing, in the storage system, the at least one input/output request based at least in part on the verification result.

In some embodiments, the obtaining the behavior profile for the user comprises one or more of obtaining behavioral information from the user and monitoring a plurality of input/output requests of the user to learn at least a portion of the behavior profile for the user.

The multi-factor authentication may comprise an out-of-band authorization request (e.g., to approve the input/output request) sent to at least one user associated with the at least one input/output request.

Other illustrative embodiments include, without limitation, apparatus, systems, methods and computer program products comprising processor-readable storage media.

BRIEF DESCRIPTION OF THE DRAWINGS

FIG. 3 is a flow diagram illustrating an exemplary implementation of a multi-factor authentication-based process for protecting requested data in a storage system, according to at least one embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for access control using user behavior profiles and storage system-based multi-factor authentication.

In one or more embodiments, techniques are provided for multi-factor authentication-based protection of requested data in a storage system. In this manner, access control of sensitive data is strengthened by an independent layer of protection in the storage system. Among other benefits, the disclosed techniques add multi-factor authentication protection to the existing access control mechanisms and thereby provide a user with flexible and strong protection of sensitive data on the storage system. A number of threats may be mitigated using the disclosed techniques, such as abuse of user credentials and privilege escalation (e.g., exploiting a weakness to gain access to sensitive data normally protected from an application or user).

Figure 1:
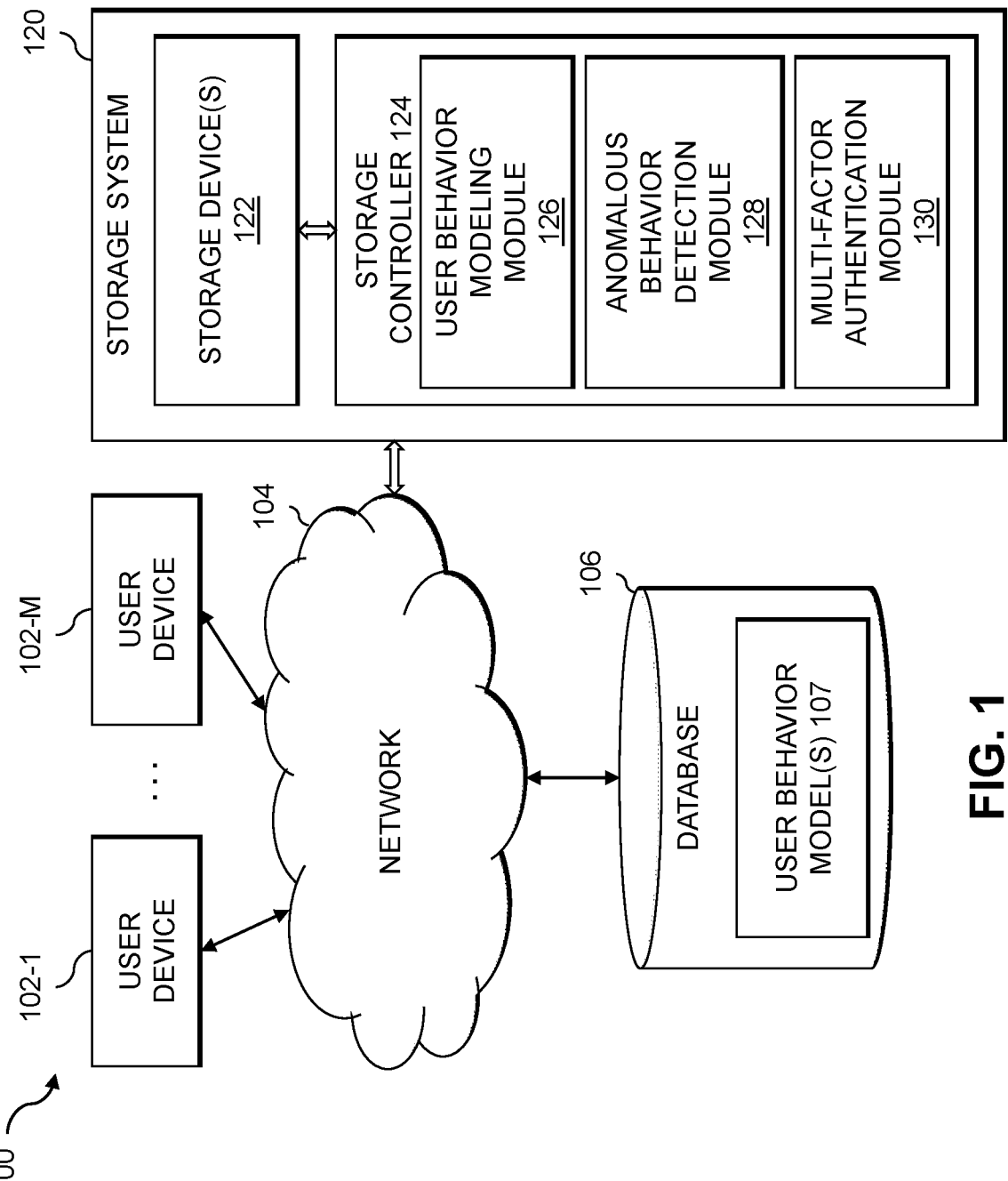
FIG. 1 illustrates a computer network configured for access control using user behavior profiles and storage system-based multi-factor authentication in accordance with an illustrative embodiment.

FIG. 1 shows a computer network (also referred to herein as an information processing system) 100 configured in accordance with an illustrative embodiment. The computer network 100 comprises a plurality of user devices 102-1, . . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a database 106, and a storage system 120.

The user devices 102 may comprise, for example, host devices and/or other devices such as mobile telephones, laptop computers, tablet computers, desktop computers or other types of computing devices. Such devices are examples of what are more generally referred to herein as "processing devices." Some of these processing devices are also generally referred to herein as "computers." When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input/output (IO) operations that are processed by the storage system 120. The term "input/output" as used herein refers to at least one of input and output. For example, IO operations may comprise write requests and/or read requests directed to logical addresses of a particular logical storage volume of the storage system 120. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

The storage system 120 illustratively comprises processing devices of one or more processing platforms. For example, the storage system 120 can comprise one or more processing devices each having a processor and a memory, possibly implementing virtual machines and/or containers, although numerous other configurations are possible.

The storage system 120 can additionally or alternatively be part of cloud infrastructure such as an Amazon Web Services (AWS) system. Other examples of cloud-based systems that can be used to provide at least portions of the storage system 120 include Google Cloud Platform (GCP) and Microsoft Azure.

The user devices 102 and the storage system 120 may be implemented on a common processing platform, or on separate processing platforms. The user devices 102 (for example, when implemented as host devices) are illustratively configured to write data to and read data from the storage system 120 in accordance with applications executing on those host devices for system users.

The storage system 120 comprises a plurality of storage devices 122 and an associated storage controller 124. The storage devices 122 store data of a plurality of storage volumes, such as respective logical units (LUNs) or other types of logical storage volumes. The term "storage volume" as used herein is intended to be broadly construed, and should not be viewed as being limited to any particular format or configuration.

The storage devices 122 of the storage system 120 illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 120.

It is therefore to be appreciated numerous different types of storage devices 122 can be used in storage system 120 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The user devices 102 are configured to interact over the network 104 with the storage system 120. Such interaction illustratively includes generating 10 operations, such as write and read requests, and sending such requests over the network 104 for processing by the storage system 120. In some embodiments, one or more of the user devices 102 comprise a multi-path input/output (MPIO) driver configured to control delivery of IO operations from the respective user device 102 to the storage system 120 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 120.

The MPIO driver may comprise, for example, an otherwise conventional MPIO driver, such as a PowerPath® driver from Dell Technologies. Other types of MPIO drivers from other driver vendors may be used.

As shown in FIG. 1, the exemplary storage controller 124 comprises a user behavior modeling module 126, an anomalous behavior detection module 128 and a multi-factor authentication module 130, as discussed further below in conjunction with FIGS. 2 and 3. In one or more embodiments, the user behavior modeling module 126 generates one or more user behavior models 107 that are stored, at least in some embodiments, in a database 106, as discussed further below. The anomalous behavior detection module 128 evaluates 10 operations that are processed by the storage system 120, relative to the one or more user behavior models 107, to initiate a multi-factor authentication, using the multi-factor authentication module 130, when anomalous user behavior is detected, as discussed further below in conjunction with FIG. 3. The multi-factor authentication module 130 may implement the multi-factor authentication using the multi-factor authentication techniques provided by one or more of Okta, Inc, Ping Identity Corporation, RSA Security LLC and/or SecureAuth Corporation.

It is to be appreciated that this particular arrangement of modules 126, 128, 130 illustrated in the storage controller 124 of the FIG. 1 embodiment is presented by way of example only, and alternative arrangements can be used in other embodiments. For example, the functionality associated with 126, 128, 130 in other embodiments can be combined into a single module, or separated across a larger number of modules. As another example, multiple distinct processors and/or memory elements can be used to implement different ones of 126, 128, 130 or portions thereof. At least portions of 126, 128, 130 may be implemented at least in part in the form of software that is stored in memory and executed by a processor.

The storage controller 124 and the storage system 120 may further include one or more additional modules and other components typically found in conventional implementations of storage controllers and storage systems, although such additional modules and other components are omitted from the figure for clarity and simplicity of illustration.

The storage system 120 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 120 in such an embodiment collectively comprise at least a portion of the storage controller 124 of the storage system 120. For example, in some embodiments the sets of processing modules of the storage nodes collectively comprise a distributed storage controller of the distributed storage system 120. A "distributed storage system" as that term is broadly used herein is intended to encompass any storage system that, like the storage system 120, is distributed across multiple storage nodes.

Each storage node of a distributed implementation of storage system 120 illustratively comprises a CPU or other type of processor, a memory, a network interface card (NIC) or other type of network interface, and a subset of the storage devices 122, possibly arranged as part of a disk array enclosure (DAE) of the storage node. These and other references to "disks" herein are intended to refer generally to storage devices, including SSDs, and should therefore not be viewed as limited to spinning magnetic media.

The storage system 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the storage system 120 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system 120 to reside in different data centers. Numerous other distributed implementations of the host devices and the storage system 120 are possible.

As noted above, the storage controller 124 can have an associated database 106 configured to store one or more user behavior models 107. Although the user behavior models 107 are shown in FIG. 1 as a separate component within database 106, in other embodiments, an additional or alternative instance of the user behavior models 107, or portions thereof, may be incorporated into the storage controller 124 or other portions of storage system 120. The user behavior models 107 may be configured to store, in at least some embodiments, behavior information for a given user that may be, for example, provided by the user and/or learned by observing a plurality of user 10 requests.

The database 106 in the present embodiment is implemented using one or more storage systems 120. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 can be one or more input/output devices (not shown), which illustratively comprise keyboards, displays or other types of input/output devices in any combination. Such input/output devices can be used, for example, to support one or more user interfaces to the user devices 102, as well as to support communication between the user devices 102 and other related systems and devices not explicitly shown.

The user devices 102 in the FIG. 1 embodiment are assumed to be implemented using at least one processing device. Each such processing device generally comprises at least one processor and an associated memory, and implements one or more functional modules for controlling certain features of the user devices 102. More particularly, the user devices 102 in this embodiment can comprise a processor coupled to a memory and a network interface. The network interface allows the user devices 102 to communicate over the network 104 with each other (as well as one or more other networked devices), and illustratively comprises one or more conventional transceivers.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for access control using user behavior profiles and storage system-based multi-factor authentication is presented by way of illustrative example only, and in other embodiments additional or alternative elements may be used. Thus, another embodiment includes additional or alternative systems, devices and other network entities, as well as different arrangements of modules and other components.

Figure 2:
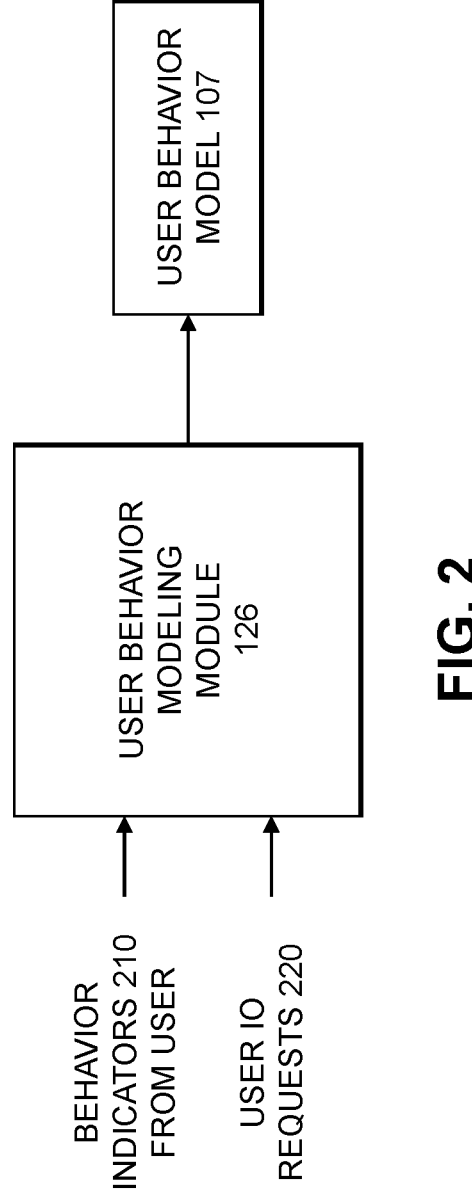
FIG. 2 illustrates the user behavior modeling module of FIG. 1 in further detail according to one or more embodiments.

FIG. 2 illustrates the user behavior modeling module 126 of FIG. 1 in further detail according to one or more embodiments. As noted above, the user behavior modeling module 126 generates one or more user behavior models 107. In the example of FIG. 2, the user (or an entity on behalf of the user) provides one or more behavior indicators 210 that predict normal behavior. For example, the behavior indicators 210 may include one or more of normal working hour, number of parallel sessions and permissible encryptions. The behavior indicators 210 may be processed to generate a user behavior profile.

In some embodiments, the user behavior modeling module 126 may also employ a learning period to monitor IO requests 220 (e.g., for any read operation or write operation from a user device 102), of a user to learn at least portions of the user behavior profile. The monitoring of IO requests 220 may be performed in the storage system 120 (thus, there is little, if any, latency to the original IO request).

In one or more embodiments, once the user behavior modeling module 126 completes the learning period and the behavior profile of a given user is ready, the disclosed multi-factor authentication techniques can be enabled to protect the requested data associated with each IO request of the given user.

The behavior indicators 210 and/or the monitored IO requests 220 are processed by the user behavior modeling module 126 to generate the user behavior model 107 for the given user.

FIG. 3 is a flow diagram illustrating an exemplary implementation of a multi-factor authentication-based process 300 for protecting requested data in a storage system, such as the storage system 120, according to at least one embodiment. In the example of FIG. 3, a user sends an IO request to the storage system 120 in step 310. The anomalous behavior detection module 128 determines whether the IO request exhibits anomalous user behavior, relative to the user behavior model 107, in step 320.

The anomalous behavior detection module 128 then requests the multi-factor authentication module 130 in step 330 to send an out-of-band authentication challenge to the user if anomalous user behavior is detected (e.g., to verify the identity of the user). The authentication challenge may comprise, for example, a request for the user to approve the IO request. In addition, the anomalous behavior detection module 128 may send the operating system of the storage system 120 a notification of the anomalous behavior so that the storage system 120 will suspend any further action from the user.

In step 340, the anomalous behavior detection module 128 completes the IO request if (i) the IO request exhibits normal user behavior and/or (ii) an anomalous IO request is verified by the multi-factor authentication (e.g., the multi-factor result indicates that the user approved the IO request or the user otherwise proves his or her identity). For example, the anomalous behavior detection module 128 may send the storage system 120 a notification that the user approved the IO request so that the storage system 120 will complete the IO request for the user.

The user behavior modeling module 126 may update the user behavior model 107 in step 350 in some embodiments based on the result of multi-factor authentication. For example, in the event of a false positive multi-factor authentication (e.g., the user approves the abnormal behavior to overcome the suspension of user activity in the storage system 120), the anomalous behavior detection module 128 will update the user behavior model 107 for the respective user so that the system will learn not to generate a false positive result for similar user activity in the future.

In the example of FIG. 3, the disclosed techniques for access control using behavior profiles and storage system-based multi-factor authentication are performed in a storage layer. In this manner, the disclosed data protection techniques are integrated inside the storage system 120 with the additional requirement of a successful multi-factor authentication for any IO requests 220 where an anomalous IO request is detected for a particular user. In this manner, the anomalous behavior detection module 128 preserves the multi-factor authentication access requirements regardless of where the data is stored in the storage system 120 (e.g., even if the data is copied or moved).

Figure 4:
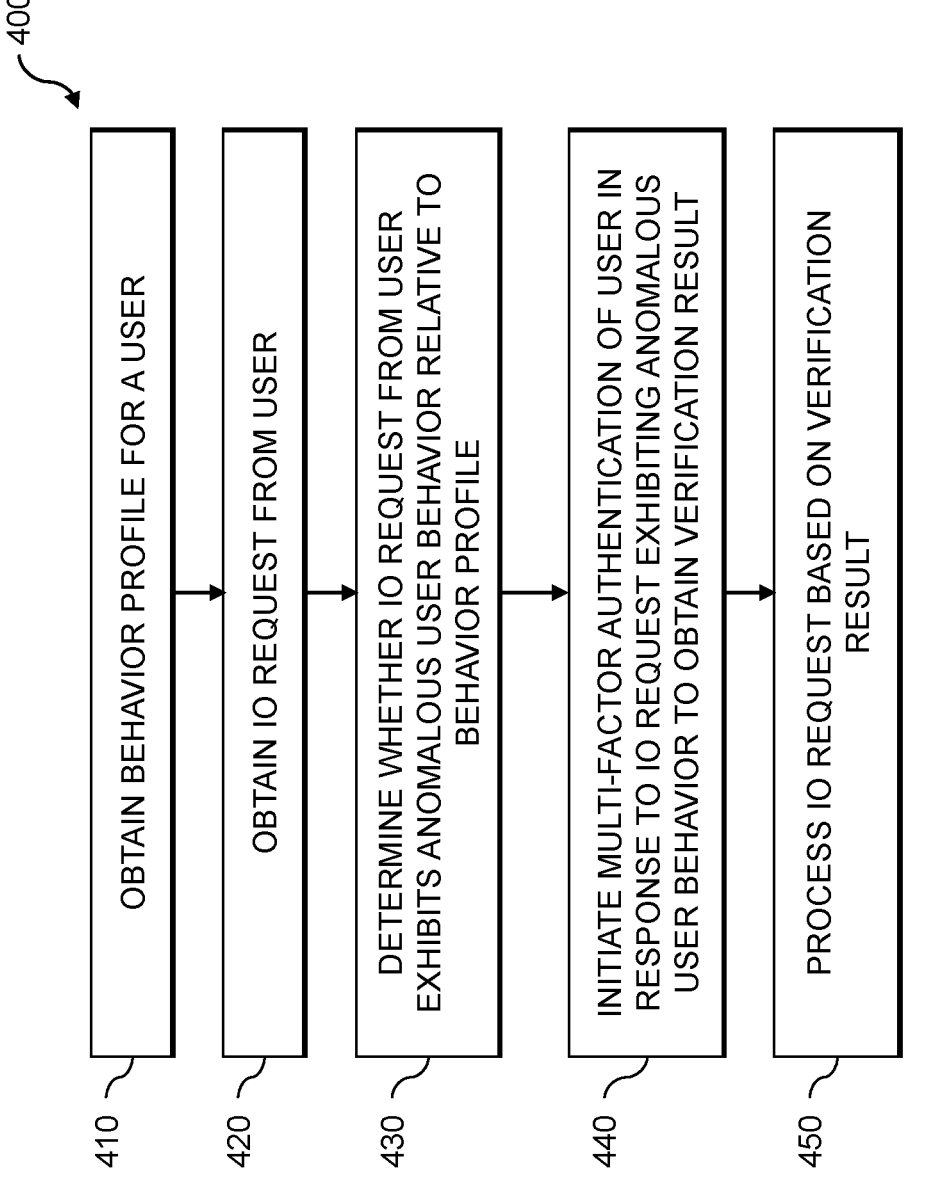
FIG. 4 is a flow diagram illustrating an exemplary implementation of a multi-factor authentication-based process for protecting requested data, according to various embodiments.

FIG. 4 is a flow diagram illustrating an exemplary implementation of a multi-factor authentication-based process 400 for protecting requested data in a storage system, according to various embodiments. In the example of FIG. 4, the exemplary multi-factor authentication-based process 400 is performed, for example, by the storage system 120, and initially obtains a behavior profile for a user in step 410. As discussed further below in conjunction with FIG. 2, the behavior profile may be obtained from behavior indicators provided by the user and/or by monitoring a plurality of IO requests of the user to learn at least a portion of the behavior profile for the user.

An IO request for data is obtained in step 420. The multi-factor authentication-based process 400 then determines in step 430 whether the IO request exhibits anomalous user behavior relative to the obtained behavior profile (e.g., using machine learning techniques).

In step 440, the multi-factor authentication-based process 400 (e.g., by the storage system 120) initiates a multi-factor authentication of the user in response to the IO request exhibiting anomalous user behavior to obtain a verification result. The multi-factor authentication of the user may comprise an out-of-band authorization request (e.g., a request to approve the IO request) sent to the user associated with the IO request. The IO request is then processed in step 450 based at least in part on the verification result. The processing of the IO request may comprise sending the operating system of the storage system 120 a notification signal of the anomalous behavior so that the storage system 120 will suspend any further action from the user and/or update the behavior profile for the user based at least in part on the verification result.

In some embodiments, the processing of an anomalous IO request may comprise performing one or more automated remedial actions in response to the verification result. For example, upon detection of an anomalous IO request by the anomalous behavior detection module 128, the anomalous behavior detection module 128 can send a notification to an administrator and/or perform another automated remedial (or mitigation) action to address the detected anomaly. For example, the performed remedial actions may comprise isolating, removing, quarantining, limiting permissions, analyzing, and deactivating one or more of the user devices 102 and/or one or more files, accounts or aspects of the user devices 102 or the user; notifying one or more third party systems (such as sending an email, or generating an alert in another system); restricting access of one or more accounts and one or more machines from accessing a network and/or one or more files or folders of the storage system 120; initiating a step-up authentication with one or more additional authentication factors; resetting or limiting permissions associated with a user, file or folder; quarantining one or more files or folders, and preventing one or more further actions from being executed associated with the user devices 102, user account or machine associated with the detected anomalous IO request.

The particular processing operations and other network functionality described in conjunction with the flow diagram of FIG. 4 are presented by way of illustrative example only, and should not be construed as limiting the scope of the disclosure in any way. Alternative embodiments can use other types of processing operations for access control using behavior profiles and storage system-based multi-factor authentication. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for access control using behavior profiles and storage system-based multi-factor authentication. The foregoing applications and associated embodiments should be considered as illustrative only, and numerous other embodiments can be configured using the techniques disclosed herein, in a wide variety of different applications.

It should also be understood that the disclosed multi-factor authentication-based protection techniques for requested data, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for access control using behavior profiles and storage system-based multi-factor authentication may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or a Function-as-a-Service FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-factor authentication-based requested data protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-factor authentication-based requested data protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
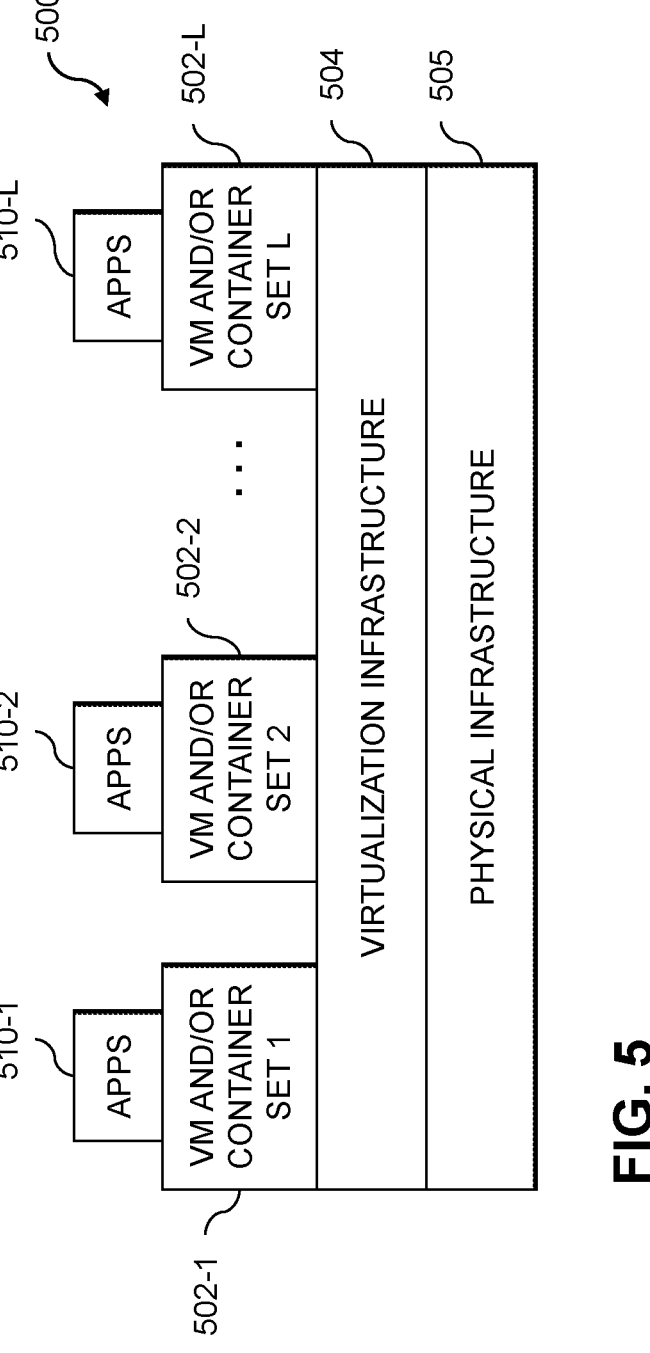
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide multi-factor authentication-based requested data protection functionality of the type described above for one or more processes running on a given one of the VMs. For example, each of the VMs can implement multi-factor authentication-based protection control logic and associated functionality for detecting anomalous user behavior for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide multi-factor authentication-based data protection functionality of the type described above for one or more processes running on different ones of the containers. For example, a container host device supporting multiple containers of one or more container sets can implement one or more instances of multi-factor authentication-based protection control logic and associated functionality for detecting anomalous user behavior.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
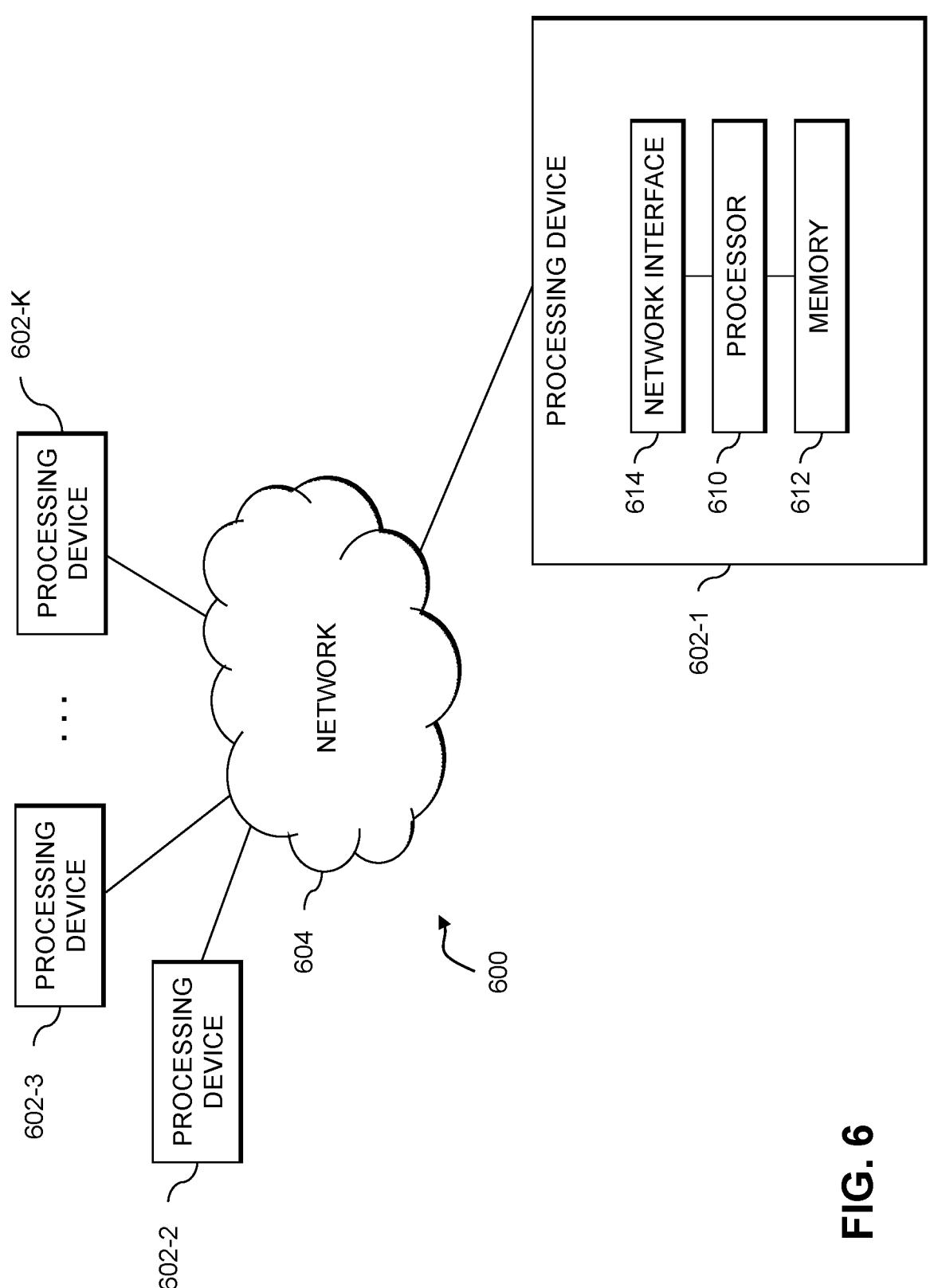
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by a storage controller of a storage system, a behavior profile for a user, wherein the storage system (i) comprises the storage controller, a plurality of storage devices and at least one processing device and (ii) processes one or more of a plurality of read requests and a plurality of write requests directed to one or more of the storage devices, the at least one processing device comprising a processor coupled to a memory, wherein the storage controller learns at least a portion of the behavior profile during a learning period by monitoring one or more of a plurality of the read requests and a plurality of the write requests of the user;

performing the following steps, in response to obtaining, by the storage controller of the storage system, at least one read or write request from the user directed to one or more of the storage devices, of the storage system, that store data associated with the obtained at least one read or write request:

determining, by the storage controller of the storage system, prior to a completion of a processing of the obtained at least one read or write request, whether the obtained at least one read or write request exhibits anomalous user behavior relative to the behavior profile;

initiating, by the storage controller of the storage system, a multi-factor authentication of the user, in response to the determining that the obtained at least one read or write request exhibits anomalous user behavior, to obtain a verification result; and processing, by the storage controller of the storage system, the obtained at least one read or write request based at least in part on the verification result.

2. The method of claim 1, wherein the obtaining the behavior profile for the user comprises obtaining behavioral information from the user.

3. The method of claim 1, wherein the multi-factor authentication comprises an out-of-band authorization request sent to at least one user associated with the at least one read or write request.

4. The method of claim 1, further comprising updating the behavior profile for the user based at least in part on the verification result.

5. The method of claim 1, wherein the obtained at least one read or write request is only completed if the verification result is successful.

6. The method of claim 1, wherein the determining whether the obtained at least one read or write request exhibits anomalous user behavior employs machine learning techniques.

7. The method of claim 1, further comprising performing one or more automated remedial actions in response to the verification result.

8. An apparatus comprising:

at least one processing device comprising a processor coupled to a memory;

the at least one processing device being configured to implement the following steps:

obtaining, by a storage controller of a storage system, a behavior profile for a user, wherein the storage system (i) comprises the storage controller, a plurality of storage devices and at least one processing device and (ii) processes one or more of a plurality of read requests and a plurality of write requests directed to one or more of the storage devices, the at least one processing device comprising a processor coupled to a memory, wherein the storage controller learns at least a portion of the behavior profile during a learning period by monitoring one or more of a plurality of the read requests and a plurality of the write requests of the user;

performing the following steps, in response to obtaining, by the storage controller of the storage system, at least one read or write request from the user directed to one or more of the storage devices, of the storage system, that store data associated with the obtained at least one read or write request:

determining, by the storage controller of the storage system, prior to a completion of a processing of the obtained at least one read or write request, whether the obtained at least one read or write request exhibits anomalous user behavior relative to the behavior profile;

initiating, by the storage controller of the storage system, a multi-factor authentication of the user, in response to the determining that the obtained at least one read or write request exhibits anomalous user behavior, to obtain a verification result; and processing, by the storage controller of the storage system, the obtained at least one read or write request based at least in part on the verification result.

9. The apparatus of claim 8, wherein the obtaining the behavior profile for the user comprises obtaining behavioral information from the user.

10. The apparatus of claim 9, wherein the multi-factor authentication comprises an out-of-band authorization request sent to at least one user associated with the at least one read or write request.

11. The apparatus of claim 8, further comprising updating the behavior profile for the user based at least in part on the verification result.

12. The apparatus of claim 8, wherein the obtained at least one read or write request is only completed if the verification result is successful.

13. The apparatus of claim 8, wherein the determining whether the obtained at least one read or write request exhibits anomalous user behavior employs machine learning techniques.

14. A non-transitory processor-readable storage medium having stored therein program code of one or more software programs, wherein the program code when executed by at least one processing device causes the at least one processing device to perform the following steps:

obtaining, by a storage controller of a storage system, a behavior profile for a user, wherein the storage system (i) comprises the storage controller, a plurality of storage devices and at least one processing device and (ii) processes one or more of a plurality of read requests and a plurality of write requests directed to one or more of the storage devices, the at least one processing device comprising a processor coupled to a memory, wherein the storage controller learns at least a portion of the behavior profile during a learning period by monitoring one or more of a plurality of the read requests and a plurality of the write requests of the user;

performing the following steps, in response to obtaining, by the storage controller of the storage system, at least one read or write request from the user directed to one or more of the storage devices, of the storage system, that store data associated with the obtained at least one read or write request:

determining, by the storage controller of the storage system, prior to a completion of a processing of the obtained at least one read or write request, whether the obtained at least one read or write request exhibits anomalous user behavior relative to the behavior profile;

initiating, by the storage controller of the storage system, a multi-factor authentication of the user, in response to the determining that the obtained at least one read or write request exhibits anomalous user behavior, to obtain a verification result; and processing, by the storage controller of the storage system, the obtained at least one read or write request based at least in part on the verification result.

15. The non-transitory processor-readable storage medium of claim 14, wherein the obtaining the behavior profile for the user comprises obtaining behavioral information from the user.

16. The non-transitory processor-readable storage medium of claim 14, wherein the multi-factor authentication comprises an out-of-band authorization request sent to at least one user associated with the at least one read or write request.

17. The non-transitory processor-readable storage medium of claim 4, further comprising updating the behavior profile for the user based at least in part on the verification result.

18. The non-transitory processor-readable storage medium of claim 14, wherein the obtained at least one read or write request is only completed if the verification result is successful.

19. The non-transitory processor-readable storage medium of claim 14, wherein the determining whether the obtained at least one read or write request exhibits anomalous user behavior employs machine learning techniques.

20. The apparatus of claim 8, further comprising performing one or more automated remedial actions in response to the verification result.

* * * * *